US011362326B2

United States Patent
Jang et al.

(10) Patent No.: US 11,362,326 B2
(45) Date of Patent: Jun. 14, 2022

(54) METHOD FOR PREPARING SILICON-CARBON-GRAPHENE COMPOSITE, COMPOSITE PREPARED ACCORDING THERETO, AND SECONDARY BATTERY TO WHICH SAME IS APPLIED

(71) Applicant: Korea Institute Of Geoscience And Mineral Resources, Daejeon (KR)

(72) Inventors: Hee-Dong Jang, Daejeon (KR); Han-Kwon Chang, Daejeon (KR); Dae-Sup Kil, Daejeon (KR); Ji-Hyuk Choi, Daejeon (KR); Sun-Kyung Kim, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 495 days.

(21) Appl. No.: 16/483,932

(22) PCT Filed: May 23, 2017

(86) PCT No.: PCT/KR2017/005334
§ 371 (c)(1),
(2) Date: Aug. 6, 2019

(87) PCT Pub. No.: WO2018/147508
PCT Pub. Date: Aug. 16, 2018

(65) Prior Publication Data
US 2019/0355985 A1 Nov. 21, 2019

(30) Foreign Application Priority Data
Feb. 9, 2017 (KR) .................. 10-2017-0018239

(51) Int. Cl.
*H01M 4/02* (2006.01)
*H01M 4/36* (2006.01)
(Continued)

(52) U.S. Cl.
CPC .......... *H01M 4/366* (2013.01); *C01B 33/021* (2013.01); *C04B 35/528* (2013.01);
(Continued)

(58) Field of Classification Search
CPC ...................................................... H01M 4/02
See application file for complete search history.

(56) References Cited

FOREIGN PATENT DOCUMENTS

| CN | 105870496 A | 8/2016 |
| CN | 105990568 A | 10/2016 |

(Continued)

OTHER PUBLICATIONS

Kim Hyegyeong et al., "Manufacturing silicon having ultrahigh purity from silicon sludge", The Korean Society of Industrial and Engineering Chemistry, vol. 8, No. 4, 2014.
Park, Jesik et al., "Recovery of silicon from silicon sludge by electrolysis". Journal of the Korean Institute of Resources Recycling, vol. 21, No. 5, 2012, 31-37.
International Search Report PCT/ISA/210 for International Application No. PCT/KR2017/005334 dated May 23, 2017.
(Continued)

*Primary Examiner* — Jacob B Marks
(74) *Attorney, Agent, or Firm* — Harness, Dickey & Pierce, P.L.C.

(57) ABSTRACT

An embodiment of the present invention provides a method for preparing a silicon-carbon-graphene composite, comprising the steps of: (step 1) adding a carbon precursor solution to silicon and performing wet grinding so as to prepare a suspension: (step 2) forming a silicon-carbon composite by spray drying the suspension; and (step 3) spray drying and heat treating a solution comprising the silicon-carbon composite and graphene oxide.

16 Claims, 11 Drawing Sheets

(51) Int. Cl.
    *C01B 33/021*    (2006.01)
    *C04B 35/528*    (2006.01)
    *C04B 35/626*    (2006.01)
    *C04B 35/64*     (2006.01)
    *H01M 4/38*      (2006.01)
    *H01M 4/583*     (2010.01)

(52) U.S. Cl.
    CPC .... *C04B 35/6261* (2013.01); *C04B 35/62655* (2013.01); *C04B 35/64* (2013.01); *H01M 4/386* (2013.01); *H01M 4/583* (2013.01); *C04B 2235/422* (2013.01); *C04B 2235/428* (2013.01); *C04B 2235/5436* (2013.01); *C04B 2235/5445* (2013.01); *C04B 2235/606* (2013.01); *H01M 2004/021* (2013.01); *H01M 2004/028* (2013.01)

(56) References Cited

FOREIGN PATENT DOCUMENTS

| | | | |
|---|---|---|---|
| KR | 10-2005-0096328 A | | 10/2005 |
| KR | 10-2011-0082894 A | | 7/2011 |
| KR | 10-2013-0016727 A | | 2/2013 |
| KR | 10-2013-0115059 A | | 10/2013 |
| KR | 101634723 | * | 12/2015 |
| KR | 101634723 B1 | | 6/2016 |

OTHER PUBLICATIONS

Chinese Office Action dated Aug. 3, 2020 issued in corresponding Chinese Appln. No. 20171051321.5.

* cited by examiner

[FIG.1]
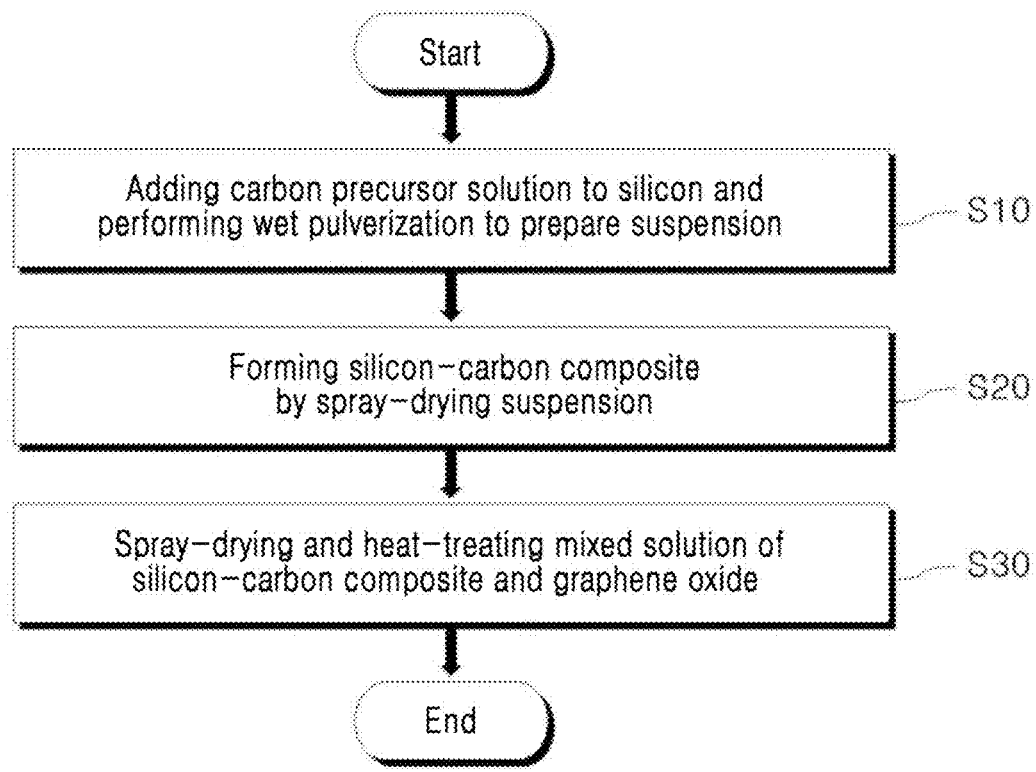

[FIG.2]
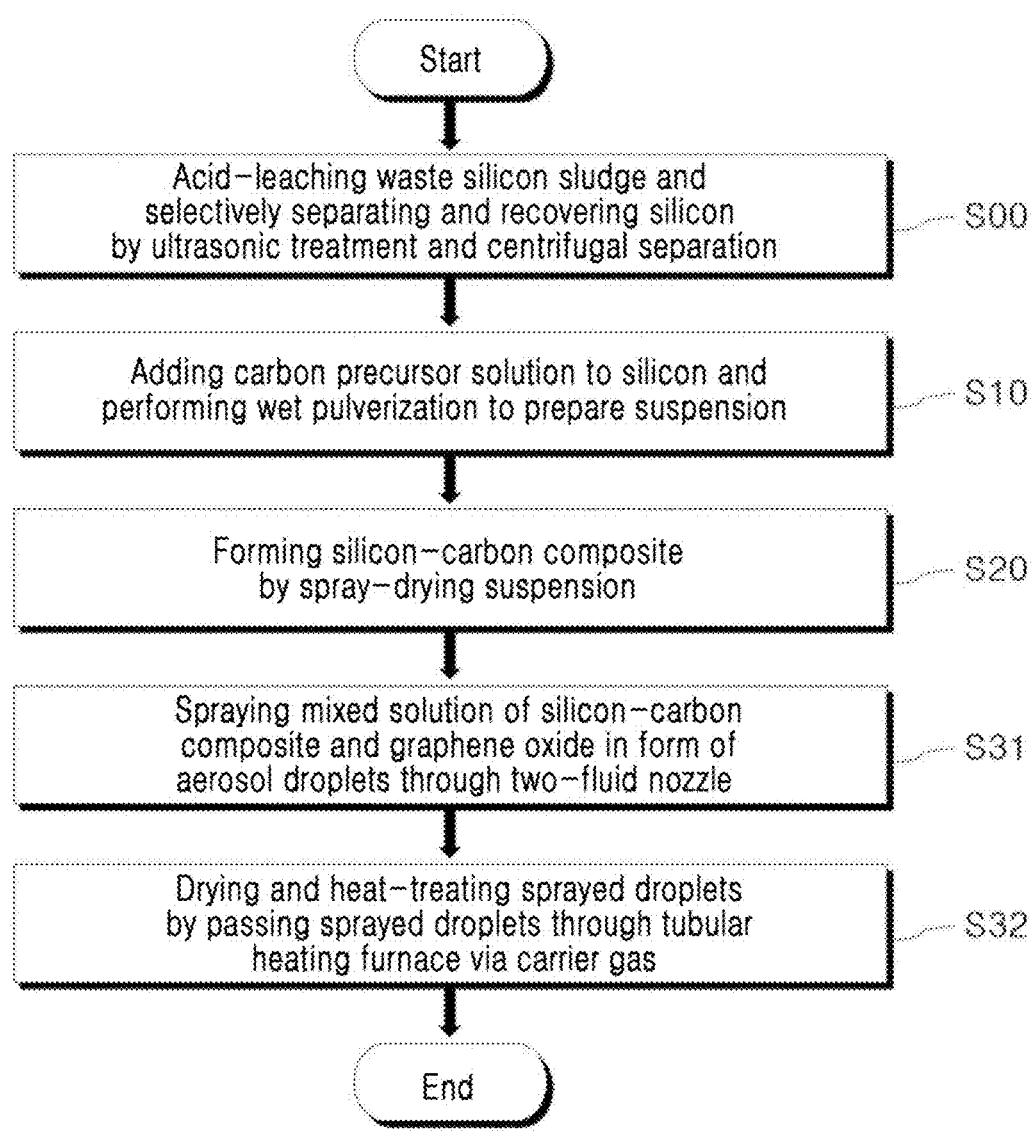

[FIG.3]
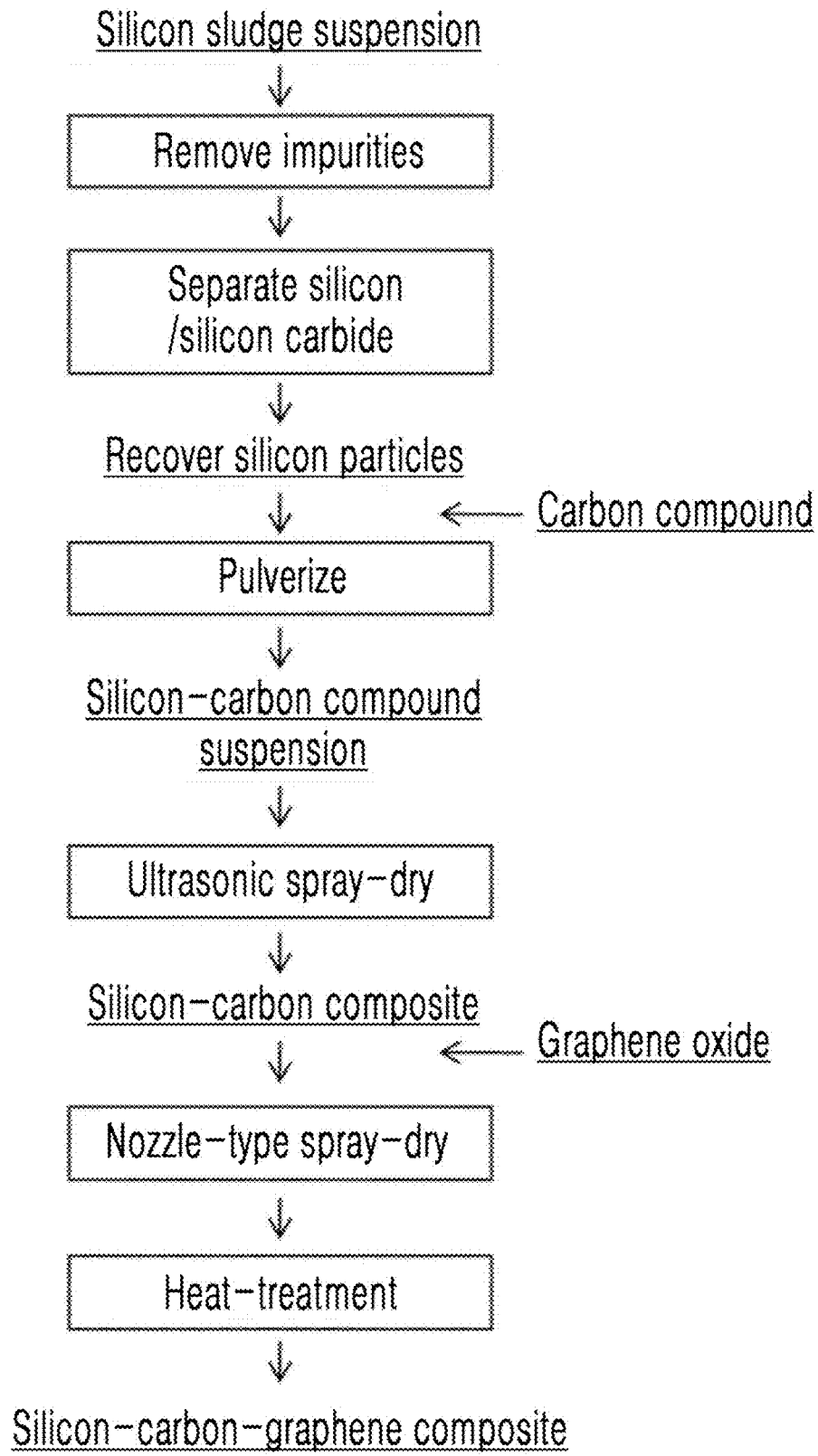

[FIG.4]
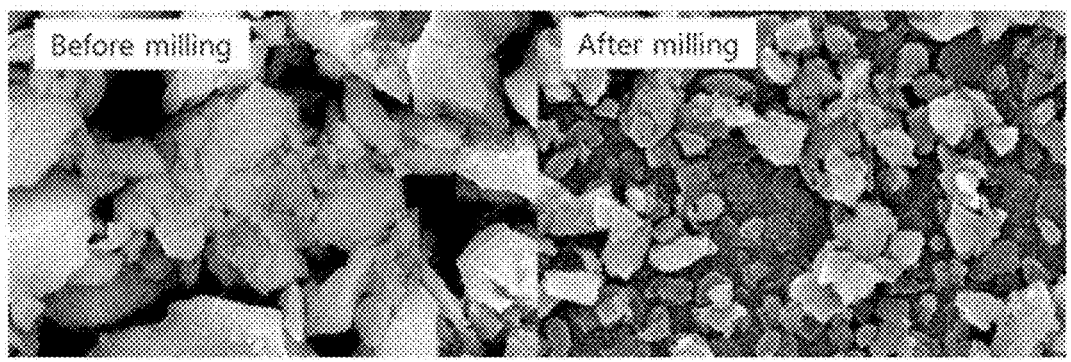
[FIG.5]
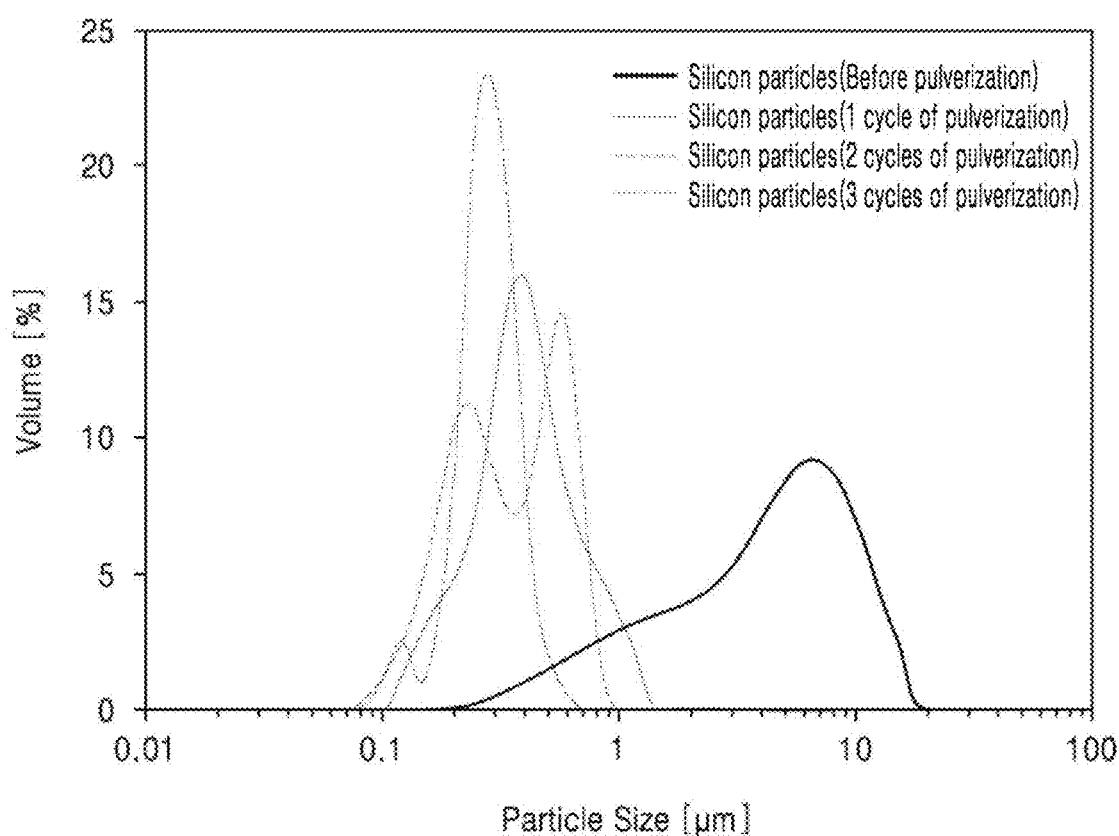

[FIG.6]
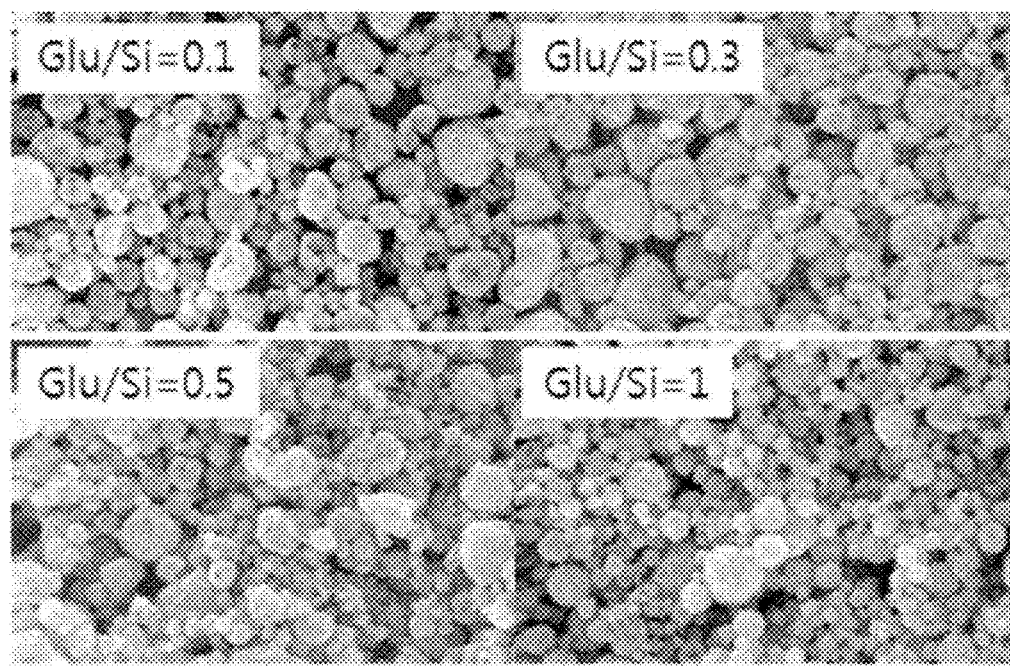
[FIG.7]
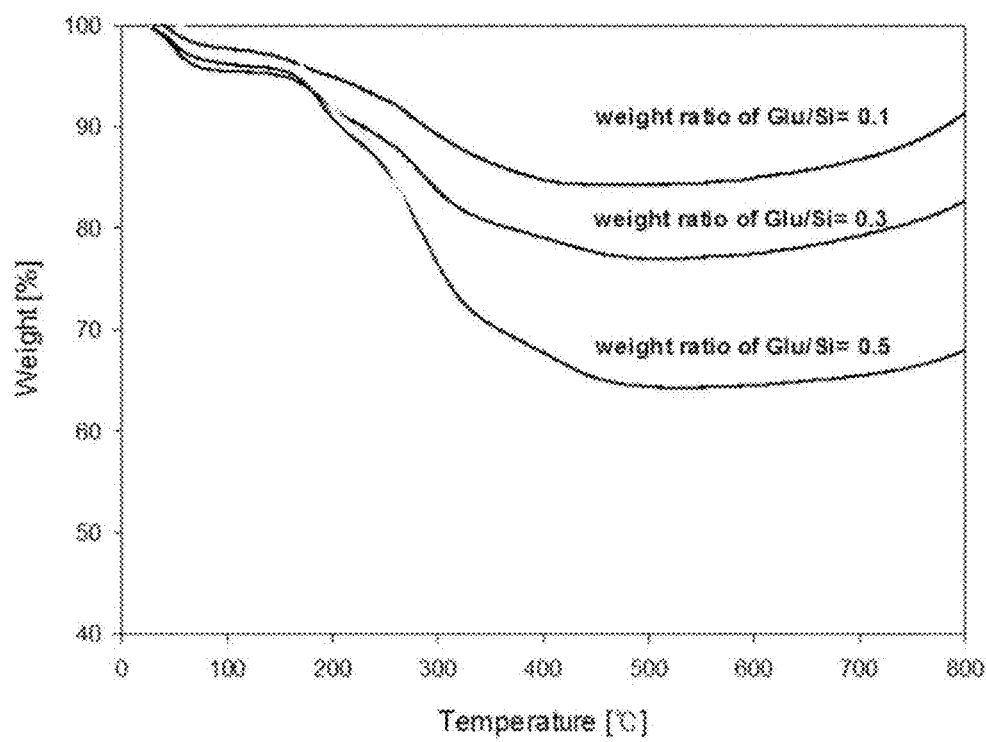

[FIG.8]
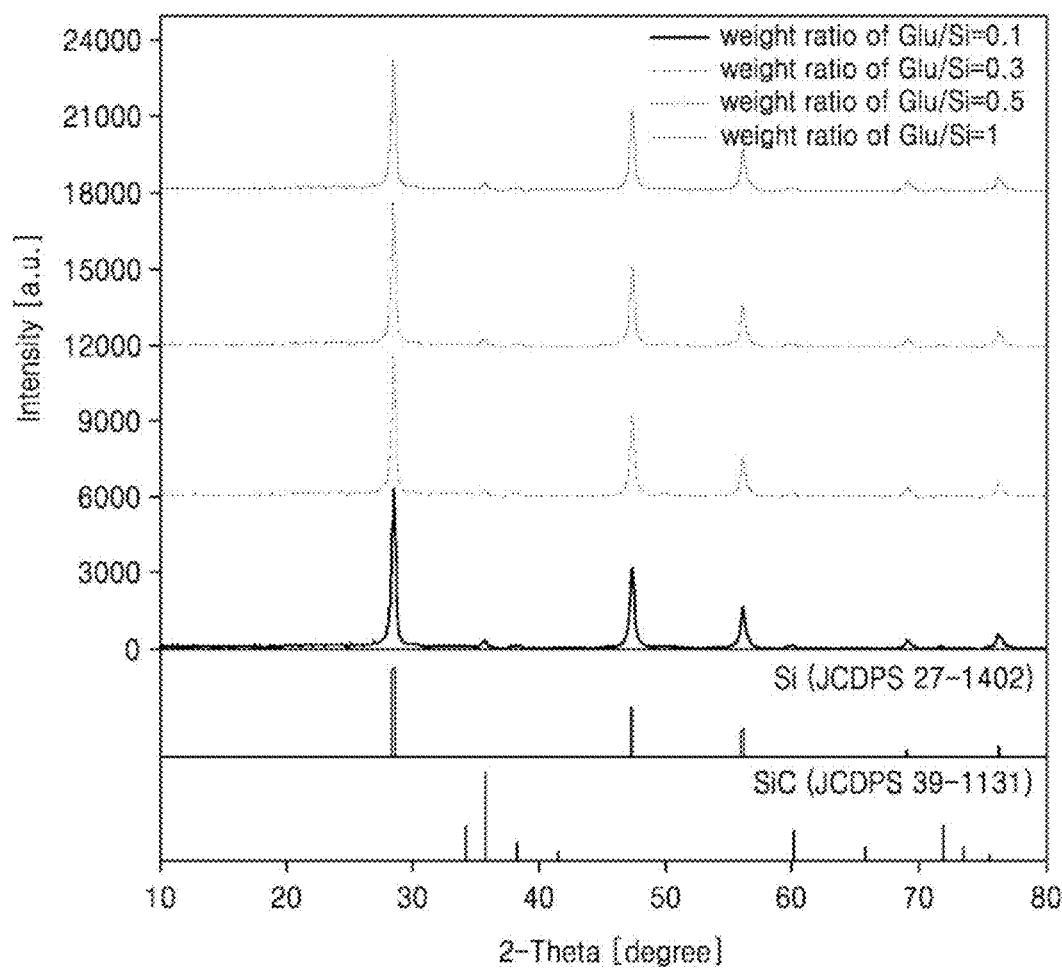

[FIG.9]
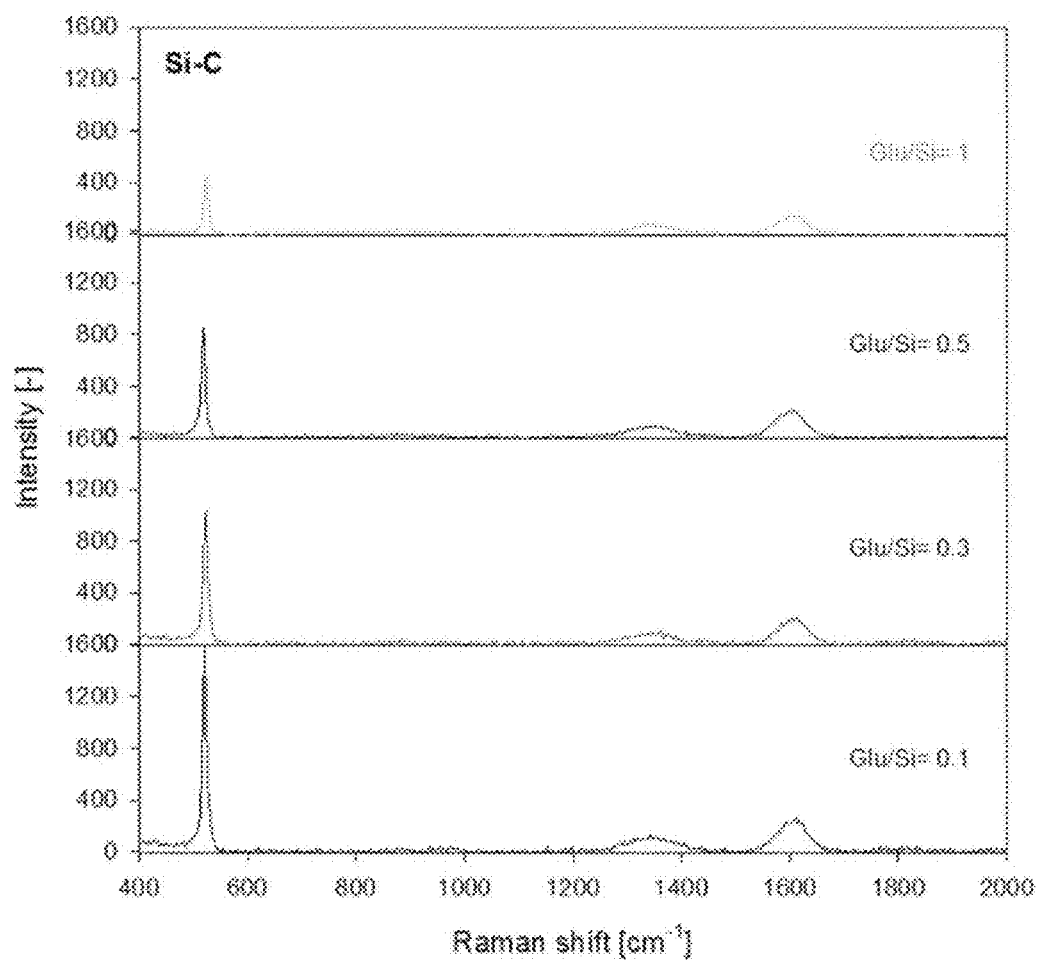

[FIG.10]
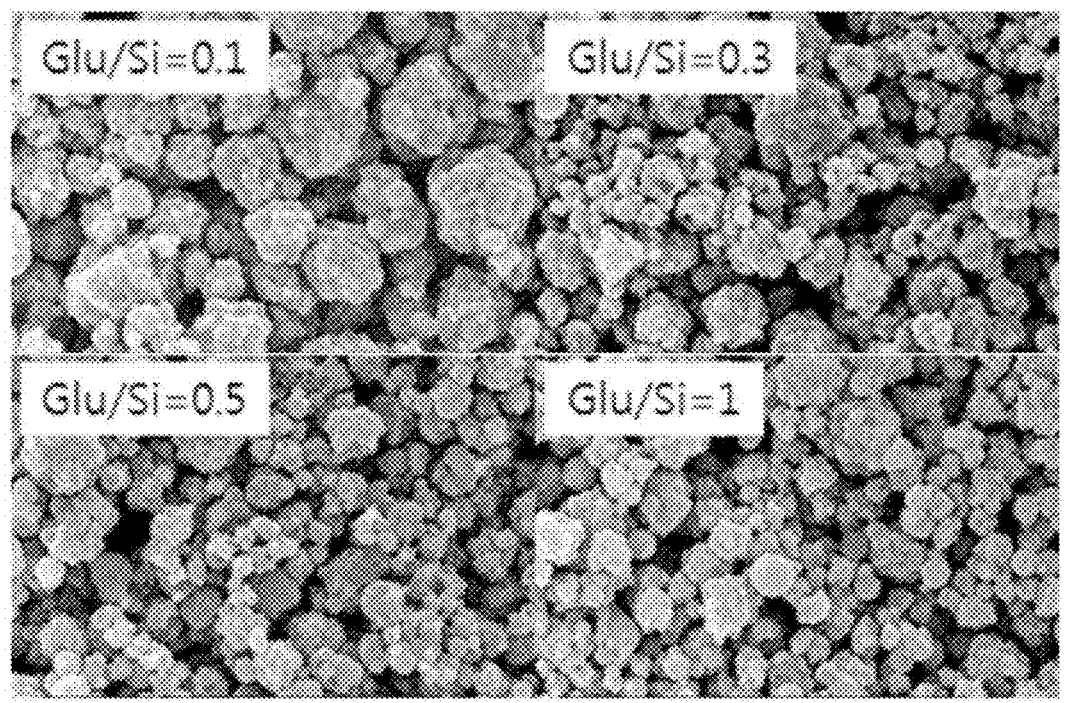

[FIG.11]
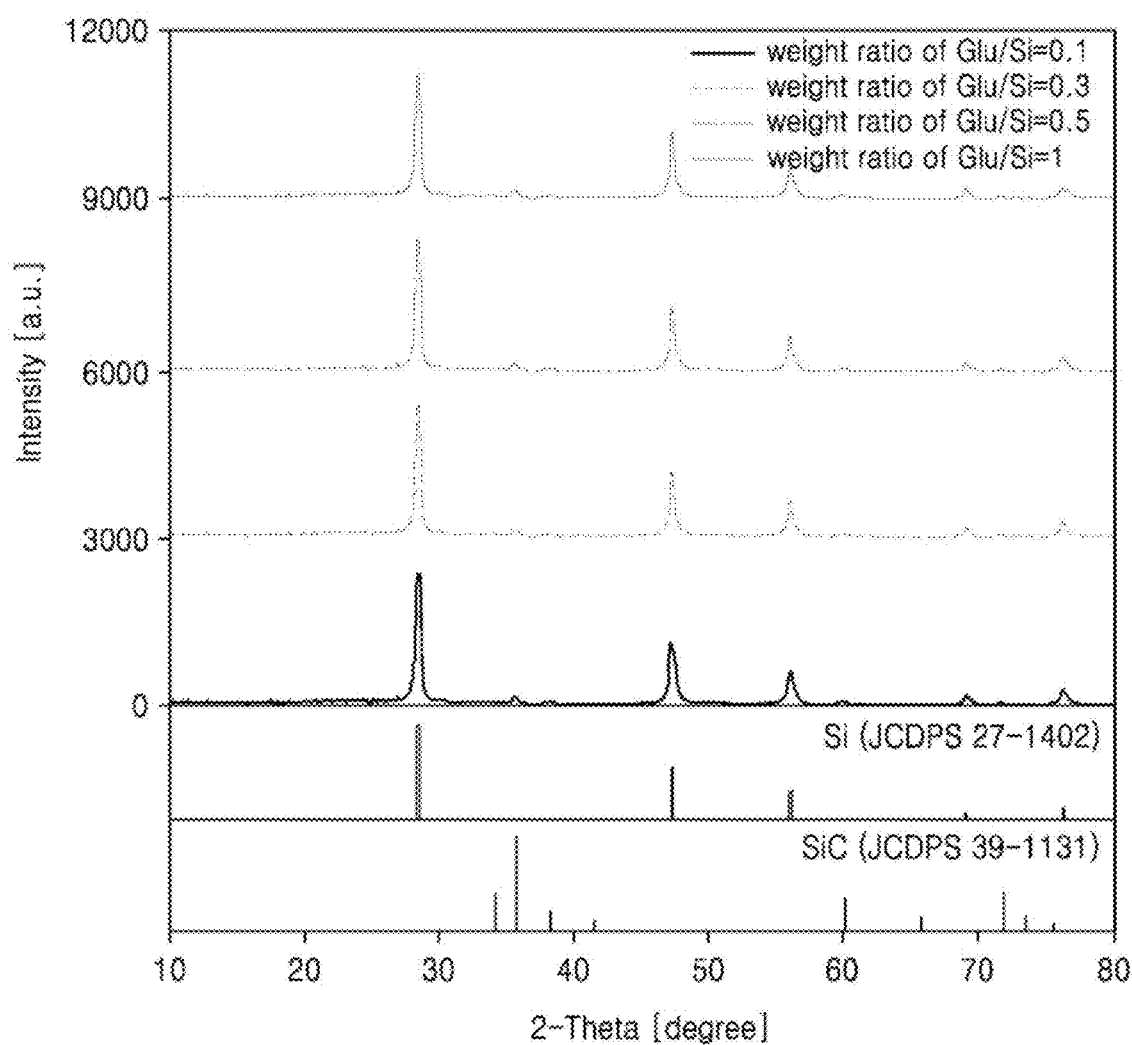

[FIG.12]
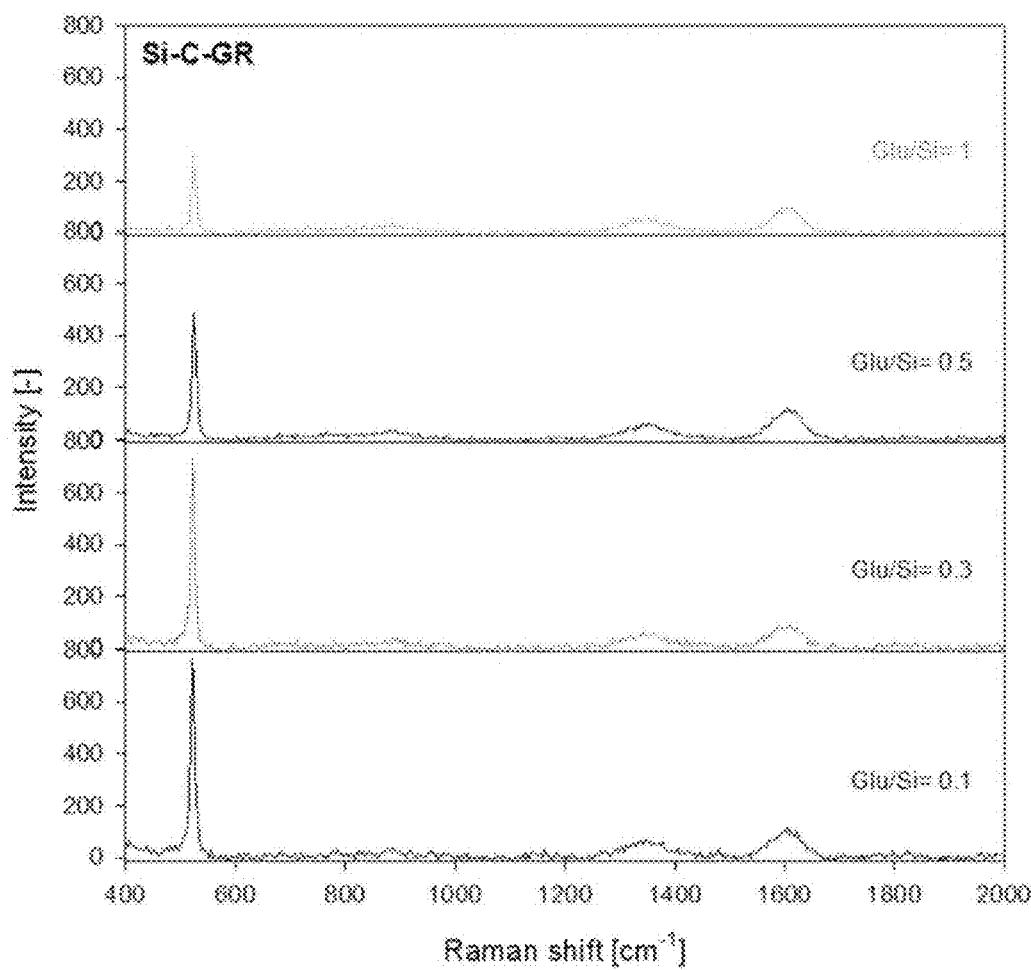

[FIG.13]
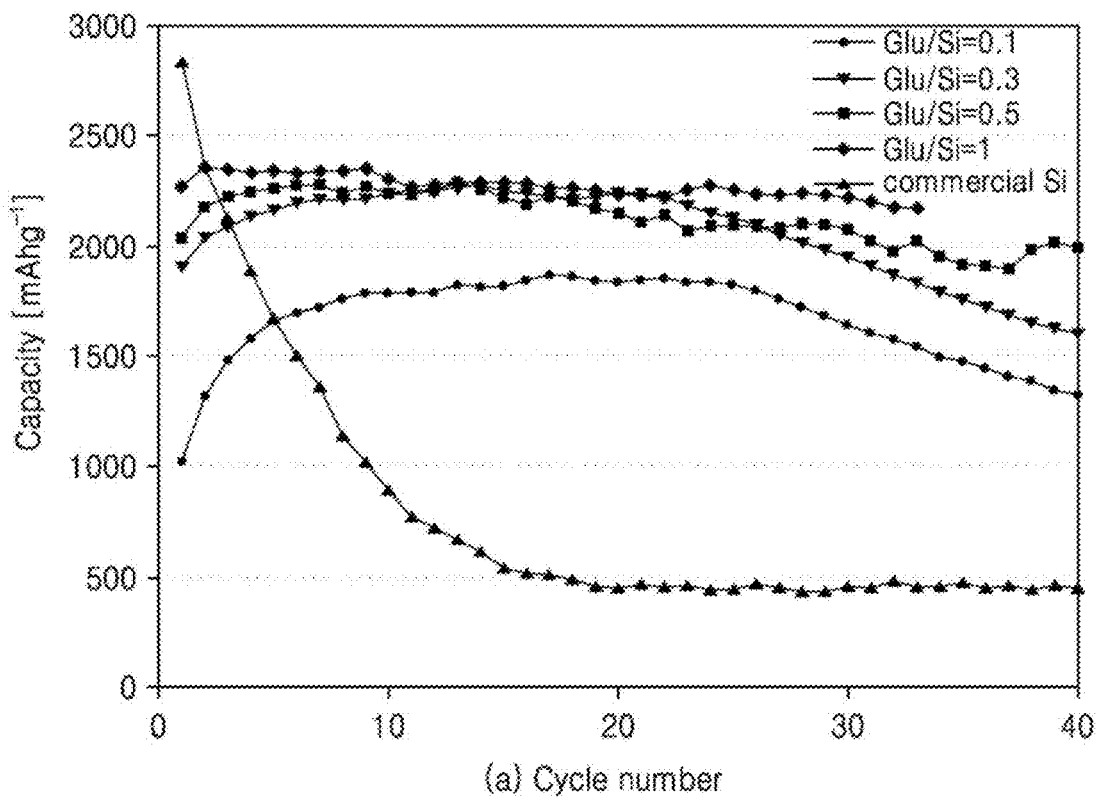
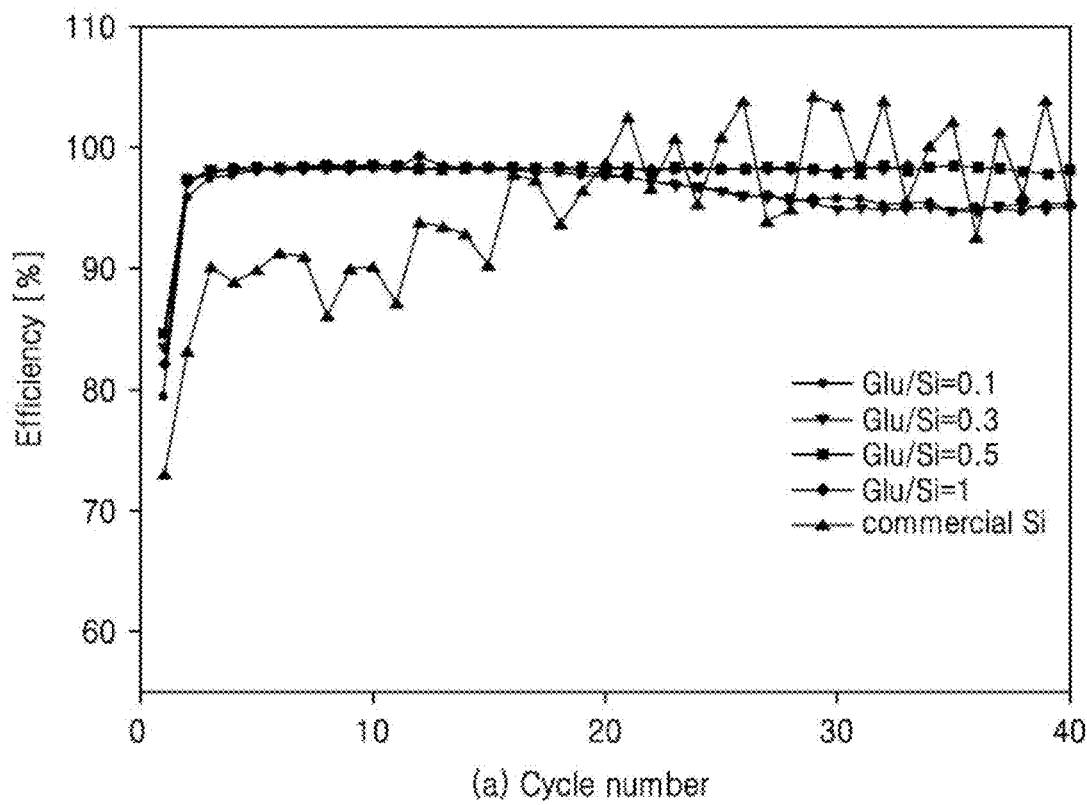

METHOD FOR PREPARING SILICON-CARBON-GRAPHENE COMPOSITE, COMPOSITE PREPARED ACCORDING THERETO, AND SECONDARY BATTERY TO WHICH SAME IS APPLIED

CROSS-REFERENCE TO RELATED APPLICATIONS

This application is a national phase under 35 U.S.C. § 371 of PCT International Application No. PCT/KR2017/005334 which has an International filing date of May 23, 2017, which designated the Republic of Korea and which claims priority to Korean patent application number KR 10-2017-0018239 filed Feb. 2, 2017.

TECHNICAL FIELD

The present invention relates to a manufacturing method of a silicon-carbon-graphene composite, a composite manufactured thereby and a secondary battery containing the same. More specifically, the present invention relates to a method for manufacturing a silicon-carbon-graphene composite by pretreating a waste silicon sludge, mixing the same with an additive, and then spray-drying and heat-treating, and relates to a composite manufactured thereby and a secondary battery to which the composite is applied.

BACKGROUND ART

In the process of cutting a silicon ingot for manufacturing a semiconductor and a silicon wafer for a solar cell, a sludge including a large amount of silicon particles is generated, most of which is treated as waste. However, if silicon separated and recovered from the waste silicon sludge is applied as a cathode material of a lithium ion secondary battery for high value-added utilization, it can achieve greater economic and environmental effects. Lithium ion secondary batteries are attracting attention in the energy industry as a main energy source for portable electronic devices and hybrid drive vehicles and etc. due to its high output and high energy characteristics. At present, carbon-based cathode materials used as cathode materials for lithium ion secondary batteries can achieve a coulombic efficiency of 99.9% in a short time, but they have limited capacitance. As a well-known cathode material for overcoming this limit, silicon-based cathode materials have been in the spotlight, and a capacitance of about 10 times or more compared to the carbon-based cathode material can be seen. However, due to the large volume change of silicon during the charge/discharge of the lithium ion secondary battery, cracks are formed on the electrode, and due to the decomposition reaction of lithium ions and electrolyte, a continuous unstable solid electrolyte interface (SEI) is formed on the silicon surface, thereby causing a problem of a decrease in capacitance as the charge/discharge cycle progresses. To solve this problem, researchers have been conducting research on how to synthesize silicon and carbon-based materials.

Liu et al. (2012) discloses a study on the use of yolk-shell designs to coat carbon on silicon particles to complement the problem. A carbon precursor was prepared by a carbonization process using polydopamine, and by coating a silicon oxide on a surface of silicon and removing the same, a void was formed. However, with the carbon coating, it was difficult to allow the large volume change of silicon caused at the time of charging/discharging and a problem of environmental pollution occurring due to use of harmful substances when removing silicon oxide was observed.

Liu et al. (2015) used a freeze-drying method and a liquid-phase reduction method to synthesize graphene on micron-sized silicon particles, but the lithium-ion secondary battery characteristic evaluation result showed a low-capacity value of 750 mAh/g. As a result of analysis, it was found that was attributed to the cracking of the electrode due to the large volume change caused by the charging/discharging of the silicon particles having a size of 1 to 10 microns and cracking of the electrode despite the existence of graphene.

Therefore, it is necessary to develop an electrode material by synthesizing silicon and carbon-based materials which can sufficiently withstand a large volume change of silicon during charging/discharging and can improve charge/discharge characteristics.

(Non-Patent Document 1) Liu, N., Wu, H., McDowell, M T, Yao, Y., Wang, C. and Cui, Y. (2012), A Yolk-Shell Design for Stabilized and Scalable Li-Ion Battery Alloy Anodes, Nano Letters, 6, 3315-3321. (Published in December 2012)

(Non-Patent Document 2) Liu, X., Chao, D., Zhang, Q., Liu, H., Hu, H., Zhao, J., Li, Y., Huang, Y., Lin, J., and Shen, A X (2015), The roles of lithium-philic giant nitrogen-doped graphene in protecting micron-sized silicon anode from fading, Scientific Reports, 5, 15665. (Published in October 2015)

DETAILED DESCRIPTION OF THE DISCLOSURE

Technical Problem

In order to solve the problems in the background art described above, the present invention is directed to provide a composite in which silicon particles are uniformly coated with a carbon material and recoated with graphene, and a method for manufacturing the same.

Further, the present invention is directed to provide a composite which can allow volume expansion at an electrode during the charging/discharging of a lithium secondary battery, which shows stable charge/discharge characteristics, and a method for manufacturing the same.

Technical Solution

In order to achieve the above-mentioned objects, an aspect of the present invention provides a manufacturing method of a silicon-carbon-graphene composite, including, adding a carbon precursor solution to silicon and performing wet pulverization to prepare a suspension in step 1; forming a silicon-carbon composite by spray-drying the suspension in step 2; spray-drying and heat-treating a mixed solution of the silicon-carbon composite and a graphene oxide in step 3.

In an embodiment, the silicon of the above-mentioned step 1 may be obtained by, acid-leaching a waste silicon sludge and selectively separating and recovering silicon in step 0.

In an embodiment, the above-mentioned step 0 further includes, drying after the acid-leaching, and after preforming ultrasonic treatment on a solution including the waste silicon sludge that was subject to drying, the silicon may be selectively separated and recovered by centrifugal separation.

In an embodiment, the ultrasonic treatment of the above-mentioned step 0 may be performed for 1 hour to 10 hours, and the centrifugal separation of the above-mentioned step 0 may be performed at a rotation speed of 100 rpm to 1000 rpm for 1 minute to 60 minutes.

In an embodiment, the carbon precursor of the above-mentioned step 1 may include one or more selected from the group consisting of monosaccharides, disaccharides, polysaccharides, polyvinylpyrrolidone (PVP), polyethylene glycol (PEG), and polyvinyl alcohol (PVA).

In an embodiment, a mixing ratio of the silicon and the carbon precursor may be 1:0.1 to 1:2.

In an embodiment, the wet pulverization of the above-mentioned step 1 may be performed such that an average particle size of the silicon is 0.1 μm to 1 μm.

In an embodiment, the wet pulverization of the above-mentioned step 1 may be performed by one or more methods selected from the group consisting of a bead mill, a basket mill, an attrition mill, and a ball mill.

In an embodiment, the spraying of the above-mentioned step 2 may be performed by ultrasonic spraying at an ultrasonic frequency of from 1.0 Mhz to 2.5 Mhz.

In an embodiment, the drying described in step 2 may be performed by passing a sprayed material through a tubular heating furnace via a carrier gas.

In an embodiment, the solution of the above-mentioned step 3 may have a graphene oxide concentration of 0.05 wt % to 0.2 wt %, and the solution of the above-mentioned step 3 may have a silicon-carbon composite concentration of 0.1 wt % to 3 wt %.

In an embodiment, the spray-drying of the above-mentioned step 3 may be performed by, spraying a mixed solution of the silicon-carbon composite and graphene oxide in a form of aerosol droplets through a two-fluid nozzle in step 3a; drying and heat-treating the sprayed droplets by passing the sprayed droplets through a tubular heating furnace via a carrier gas in step 3b.

In an embodiment, the heat-treatment temperature described in the above-mentioned step 3 or the above-mentioned step 3b may be 500° C. to 1000° C.

In order to achieve the above-mentioned objects, another aspect of the present invention provides a manufacturing method of a silicon-carbon-graphene composite, including, acid-leaching a waste silicon sludge, and selectively separating and recovering silicon by ultrasonic treatment and centrifugal separation in step 0; adding a carbon precursor solution to the recovered silicon and performing wet pulverization to prepare a suspension in step 1; forming a silicon-carbon composite by ultrasonically spray-drying the suspension in step 2; spraying a mixed solution of the silicon-carbon composite and graphene oxide in a form of aerosol droplets through a two-fluid nozzle in step 3a; and drying and heat-treating the sprayed droplets by passing the sprayed droplets through a tubular heating furnace via a carrier gas in step 3b.

In order to achieve the above-mentioned objects, yet another aspect of the present invention provides a silicon-carbon-graphene composite, including, a silicon-carbon composite comprising a carbon layer formed around silicon particles; and a graphene layer formed around an agglomerate comprising a plurality of the silicon-carbon composites, wherein the silicon-carbon-graphene composite has an average particle size of 0.5 μm to 20 μm, and the graphene layer is formed by agglomeration of a plurality of crumpled graphene sheets.

In order to achieve the above-mentioned objects, yet another aspect of the present invention provides a secondary battery including, an anode; a cathode including the silicon-carbon-graphene composite of claim 15; a separator formed between the anode and the cathode; and an electrolyte.

Advantageous Effects

According to an aspect of the present invention, when the prepared composite material is applied to the electrode material of a secondary battery, the electrical conductivity can be further increased and a large volume change can be controlled thereby it is possible to improve charge/discharge electrochemical characteristics.

In addition, during the charging/discharging of a secondary battery to which the composite is applied as an electrode, the surface of the silicon composite and the electrolyte cannot come into direct contact, and thus it is possible to show excellent battery characteristics for preventing electrode damage.

The effects of the present invention are not limited to the effects described above, and are understood to include all effects that can be inferred based on the detailed description of the present invention or the invention described in the claims.

DESCRIPTION OF THE DRAWINGS

FIG. 1 is a schematic view illustrating an example of a manufacturing method of a silicon-carbon-graphene composite according to an embodiment of the present invention.

FIG. 2 is a schematic view illustrating another example of a manufacturing method of a silicon-carbon-graphene composite.

FIG. 3 is a schematic view illustrating yet another example of a manufacturing method of a silicon-carbon-graphene composite.

FIG. 4 is a FE-SEM photograph showing the shape of silicon particles before and after pulverization in Experimental Example 1 of the present invention.

FIG. 5 is a graph showing a distribution map based on the number of pulverizations in Experimental Example 1 of the present invention.

FIG. 6 is a FE-SEM photograph showing the shape of a silicon-carbon composite based on a glucose/silicon weight ratio in Experimental Example 2 of the present invention.

FIG. 7 is a graph showing the results of a thermogravimetric analysis of a silicon-carbon composite based on a glucose/silicon weight ratio in Experimental Example 2 of the present invention.

FIG. 8 is a graph showing the results of an X-ray diffraction analysis of a silicon-carbon composite based on a glucose/silicon weight ratio in Experimental Example 3 of the present invention.

FIG. 9 is a graph showing the results of Raman spectroscopy of a silicon-carbon composite based on a glucose/silicon weight ratio in Experimental Example 3 of the present invention.

FIG. 10 is a FE-SEM photograph showing the shape of a silicon-carbon-graphene composite based on a glucose/silicon weight ratio in Experimental Example 4 of the present invention.

FIG. 11 is a graph showing the results of an X-ray diffraction analysis of a silicon-carbon-graphene composite based on a glucose/silicon weight ratio in Experimental Example 5 of the present invention.

FIG. 12 is a graph showing the results of Raman spectroscopy of a silicon-carbon-graphene composite based on a glucose/silicon weight ratio in Experimental Example 5 of the present invention.

FIG. 13 is a graph showing charge/discharge characteristics of a secondary battery to which a silicon-carbongraphene composite based on a glucose/silicon weight ratio is used as a cathode in Experimental Example 6 of the present invention.

BEST MODE FOR CARRYING OUT THE INVENTION

Hereinafter, preferred embodiments of the present invention will be described in detail with reference to the accompanying drawings.

The advantages and features of the present invention, and manner of achieving them will become more apparent with the embodiments described in detail below with reference to the accompanying drawings.

However, the present invention is not limited to the embodiments described below, and can be embodied in various forms, and the present embodiment is intended to make the disclosure of the present invention more complete, and to clearly disclose the technology of the invention to one skilled in the arts to. Further the present invention is only defined by the scope of the claims.

Moreover, in the course of explaining the present invention, well-known techniques and the like may be omitted from the detailed description if they are considered to obscure the gist of the present invention.

An aspect of the present invention provides a manufacturing method of a silicon-carbon-graphene composite, including, adding a carbon precursor solution to silicon and performing wet pulverization to prepare a suspension in step 1 in S10;

forming a silicon-carbon composite by spray-drying the suspension in step 2 in S20;

spray-drying and heat-treating a mixed solution of the silicon-carbon composite and a graphene oxide in step 3 in S30.

Hereinafter, each step of manufacturing method of a silicon-carbon-graphene composite according to an aspect of the present invention will be described in detail.

In the above-mentioned step 1 in S10 of the manufacturing method of a silicon-carbon-graphene composite according to an aspect of the present invention, a carbon precursor solution is added to silicon and wet pulverization is performed to prepare a suspension.

The silicon of the above-mentioned step 1 may be prepared by acid-leaching a waste silicon sludge and selectively separating and recovering silicon in step 0 in S00.

The waste silicon sludge of the above-mentioned step 0 may be produced in a silicon wafer manufacturing process, or may be produced in a silicon wafer cutting or polishing process. In the cutting process, based on the use of slurry for cutting that contains silicon carbide and cutting oil and the like with a wire saw, a silicon sludge containing a large amount of silicon particles and silicon carbide may be produced.

The acid which can be used in the acid leaching described in the above-mentioned step 0 may include hydrochloric acid, sulfuric acid, nitric acid and the like, and hydrochloric acid is preferably used. In the case of mixed acids, they have the potential to dissolve silicon and are therefore not preferable.

The acid leaching described in step 0 may be performed by adding the waste silicon sludge to an acid solution, and the concentration of the acid solution is preferably from 1 M to 5 M. In the acid leaching concentration, metal impurities of the waste silicon slag can be easily removed, and the waste of resource can be minimized.

Preferably, the acid leaching described in the above-mentioned step 0 may be performed at a temperature of from 50° C. to 150° C. for 1 hour to 10 hours. At such acid leaching temperature and time, the metal impurities of the waste silicon slag can be easily removed, and energy waste can be minimized.

The solution that undergone the acid-leaching of the above-mentioned step 0 may be cooled to a normal temperature, and after separating remaining liquid, distilled water may be added to the remaining waste silicon sludge for washing.

The above-mentioned step 0 may further include drying after the acid-leaching, and after preforming ultrasonic treatment on a solution including the waste silicon sludge that was subject to drying, the silicon may be selectively separated and recovered by centrifugal separation.

The solid-liquid ratio of the waste silicon sludge to stilled water (g:mL) in the solution containing the waste silicon precipitate described in the above-mentioned step 0 is preferably 1:50 to 200. In such a solid-liquid ratio, the ultrasonic treatment and centrifugal separation treatment in the subsequent steps can be easily performed, and the waste of resources can be minimized.

The ultrasonic treatment of the above-mentioned step 0 is preferably performed for 1 hour to 10 hours. At the time of the ultrasonic treatment, the silicon and silicon carbide of the waste silicon sludge in the solution can be easily separated, thereby minimizing energy waste.

The centrifugal separation of the above-mentioned step 0 is preferably performed on the sonicated solution via a centrifugal separator at a rotation speed of 100 rpm to 1000 rpm for 1 minute to 60 minutes. Silicon can be easily recovered at such centrifugal separation rotation speed and time, and energy waste can be minimized.

The carbon precursor of the above-mentioned step 1 may include one or more selected from the group consisting of monosaccharides, disaccharides, polysaccharides, polyvinylpyrrolidone (PVP), polyethylene glycol (PEG), and polyvinyl alcohol (PVA). The monosaccharide in the above-mentioned step 1 may be galactose, glucose and fructose, etc., the disaccharide in the above-mentioned step 1 may be sucrose, maltose and lactose, etc., and the polysaccharide in the above-mentioned step 1 may be dextran, starch, xylan, inulin, levan and galactan, and the like. Preferably, the carbon precursor of the above-mentioned step 1 may include monosaccharides, more preferably may include glucose. The carbon precursor of the above-mentioned step 1 may be coated on the surface of silicon particles by a subsequent heat treatment process and a carbon layer can be formed.

In the above-mentioned step 1, the mixing ratio by weight of the silicon and the carbon precursor may be 1:0.1 to 1:2, preferably 1:0.1 to 1, and more preferably 1:0.5 to 1. If the mixing ratio of the silicon and the carbon precursor in the above-mentioned step 1 is less than 1:0.1, a problem may occur in that the damage and oxidation of silicon cannot be prevented in the subsequent step of pulverizing, and there is a concern for deterioration of charge/discharge characteristics of an electrode including a composite manufactured through a later step. If the mixing ratio of the silicon and carbon precursor in the above-mentioned step 1 exceeds 1:2, carbon precursor may be wasted when it comes to preventing the damage and oxidation of silicon during the pulverization treatment in the subsequent step, and there is a concern for a decrease in electrostatic capacity of an electrode including a composite manufactured through a later step.

The mixture of silicon and carbon precursor of the above-mentioned step 1 is preferably a solution containing 1 wt % to wt % of silicon. The wet pulverization treatment in the subsequent step can be easily performed in the silicon concentration of the mixture, and waste of resources can be minimized.

The wet pulverization of the above-mentioned step 1 may be performed to pulverize the silicon particles to an average size of 0.1 μm to 2 μm in size, and preferably, the silicon particles may be pulverized to an average size of 0.1 μm to 1 μm. If the wet pulverization is performed such that the average particle size of the silicon is less than 0.1 μm, a problem may occur in that a plurality of silicon particles agglomerate, which makes carbon coating difficult. If the wet pulverization is performed such that the average particle size of the silicon exceeds 2 μm, there is a concern for the generation of cracks at the time of charging/discharging in an electrode including a composite manufactured through a later step.

The wet pulverization in the above-mentioned step 1 may be performed 1 to 3 times, preferably 3 times. With the above-mentioned number of pulverizations, the target average size of silicon particles can be easily achieved, and energy waste can be minimized.

The wet pulverization in the above-mentioned step 1 may be performed by a method selected from the group consisting of a bead mill, a basket mill, an attrition mill, and a ball mill, and preferably may be performed by a bead mill using a metal oxide bead.

Preferably, the bead mill in the above-mentioned step 1 is performed at a rotor rotation speed of 1000 rpm to 7000 rpm, and the transfer flow rate of the carbon precursor is preferably from 20 ml/min to 200 ml/min. The rotor rotation speed and the transfer flow rate of the bead mill of the above-mentioned step 1 may prevent damage and oxidation of the silicon surface but facilitates the pulverization to a target silicon particle size, and energy waste can be minimized.

The concentration of the silicon-carbon precursor suspension prepared in the above-mentioned step 1 may be 0.2 wt % to 3 wt %. The concentration of the suspension of the above-mentioned step 1 is not limited thereto, as long as the concentration allows the spray drying process of a subsequent step to be performed effectively.

In a manufacturing method of a silicon-carbon-graphene composite according to an aspect of the invention, the above-mentioned step 2 in S20 forms a silicon-carbon composite by spray-drying the suspension.

The spraying of the above-mentioned step 2 may be performed by ultrasonic spraying. Preferably, the ultrasonic frequency of the ultrasonic spray is 1.0 Mhz to 2.5 Mhz. In this frequency, uniformly spayed droplets can be formed, and energy waste can be minimized.

The drying in the above-mentioned step 2 may be performed by passing a sprayed material through a tubular heating furnace via a carrier gas. The flow rate of the carrier gas may be from 0.5 L/min to 5 L/min. The carrier gas may be an inert gas, and specifically, argon gas, nitrogen gas, and helium gas are preferably used. In the above-mentioned carrier gas flow rate, the average particle size of silicon-carbon composite to be manufactured can be uniformly controlled, and energy waste can be minimized.

The drying temperature in the above-mentioned step 2 is preferably from 200° C. to 450° C. At the drying temperature, the silicon-carbon composite can be easily formed, minimizing energy waste.

In a manufacturing method of a silicon-carbon-graphene composite according to an aspect of the invention, the above-mentioned step 3 spray-dries and heat-treats a mixed solution of a silicon-carbon composite and graphene oxide.

The solution of the above-mentioned step 3 may have a graphene oxide concentration of 0.05 wt % to 0.2 wt % and a solvent may be added to perform mixture such that the concentration of silicon-carbon composite is 0.1 wt % to 3 wt %. In the graphene oxide concentration and the silicon-carbon composite concentration, the spray-drying process of a subsequent step can be easily performed, and the silicon-carbon-graphene composite can be efficiently formed, and waste of resources can be minimized.

The spray-drying in the above-mentioned step 3 may be performed by, spraying a mixed solution of the silicon-carbon composite and graphene oxide in a form of aerosol droplets through a two-fluid nozzle in step 3a in S31; and drying and heat-treating the sprayed droplets by passing the sprayed droplets through a tubular heating furnace via a carrier gas in step 3b in S32.

The two-fluid nozzle in the above-mentioned step 3a may atomize liquid by mixed dispersion due to the collision of liquid and gas. The two-fluid nozzle differs from the conventional direct pressure based nozzles in that it has the advantage of maintaining ultra-fine particle spraying even at low pressure.

When the liquid droplets are transferred to the heating furnace in the above-mentioned step 3b, they may be transported by one or more gases selected from the group consisting of argon gas, helium gas and nitrogen gas, preferably by argon gas.

The flow rate of the gas when transferring the droplets to the furnace in above-mentioned step 3b may range from 5 L/min to 15 L/min, preferably from 5 L/min to 10 L/min. The flow rate for transferring the droplets to the furnace in the above-mentioned step 3b may range from 2 ml/min to 10 ml/min, preferably from 2 ml/min to 8 ml/min. The above-mentioned carrier gas flow rate and droplet flow rate facilitate, drying and self-assembly of the droplets, and energy waste can be minimized.

The drying temperature in the above-mentioned step 3 or 3b may be 150° C. to 250° C., and may preferably be 180° C. to 220° C. If the drying temperature is less than 150° C., a there a problem that some of the solvent unable to evaporate are left in the liquid droplets, and a problem may occur wherein graphene having a crumpled form cannot easily form an agglomerated graphene oxide layer. If the temperature of the heating furnace exceeds 250° C., an excessive energy waste may be caused in forming a composite including a graphene oxide layer.

When the solvent within the liquid droplet evaporates through the step of transferring to the heating furnace and drying in step 3b, due to a capillary molding phenomenon, the graphene oxide sheets are gathered together, thereby enabling a graphene layer having a crumpled form to be formed on a silicon-carbon composite.

The composite to which drying was performed in the above-mentioned step 3b may be collected by a filter through a cyclone, and then heat-treatment may be performed for the reduction of the graphene oxide full carbonization of the carbon precursor.

The heat-treatment of the above-mentioned step 3 or 3b may be performed at a temperature of 500° C. to 1000° C., preferably at a temperature of 600° C. to 900° C. If the heat-treatment temperature is less than 600° C., there can be a concern that efficiency of graphene oxide reduction and carbonization of the carbon oxide precursor may be lowered. If the heat-treatment temperature exceeds 1000° C., excessive energy may be wasted in the reduction of graphene oxide and the carbonization of the carbon oxide precursor.

The heat-treatment of the above-mentioned step 3b may be performed in a muffle furnace, and may be performed in a gas environment selected from the group consisting of argon, helium and nitrogen, and preferably in an argon gas atmosphere.

In the heat-treatment of the above-mentioned step 3b, the gas may show a predetermined flow rate, which may be 0.5 l/min to 2 l/min, but as long as the flow rate of the gas facilitates reducing and carbonization heat-treatment is not limited thereto.

The heat-treatment of the above-mentioned step 3 or 3b may be performed for 10 minutes to 100 minutes, and preferably for 15 minutes to 80 minutes. If the heat-treatment time is less than 10 minutes, a problem may occur in that the graphene oxide cannot be effectively reduced. If the heat-treatment time exceeds 100 minutes, excessive energy waste may be occur in the process of reducing the graphene oxide.

Through the above-mentioned manufacturing method (steps 1 to step 3), the double carbon-graphene coating layer formed around the silicon particles can prevent formation of an unstable solid electrolyte interface (SEI) on the surface of silicon due to the decomposition reaction of lithium ions and electrolyte solution during the charging/discharging of a lithium secondary battery. Thereby, the capacitance does not decrease as the charge/discharge cycle progresses, and the capacitance is kept constant, and a large volume change of silicon can be allowed.

Another aspect of the invention provides a manufacturing method of a silicon-carbon-graphene composite, including, acid-leaching a waste silicon sludge, and selectively separating and recovering silicon by ultrasonic treatment and centrifugal separation in step 0 in S00;

adding a carbon precursor solution to the recovered silicon and performing wet pulverization to prepare a suspension in step 1 in S10;

forming a silicon-carbon composite by ultrasonically spray-drying the suspension in step 2 in S20;

spraying a mixed solution of the silicon-carbon composite and graphene oxide in a form of aerosol droplets through a two-fluid nozzle in step 3a in S31; and drying and heat-treating the sprayed droplets by passing the sprayed droplets through a tubular heating furnace via a carrier gas in step 3b in S32.

In the manufacturing method (step 0 to step 3b), the detailed description of each step may be the same as that described above.

Meanwhile, as a method for manufacturing a silicon-carbon-graphene composite by a single process, a colloidal solution formed by mixing a water-soluble carbon precursor (PVP, glucose) and a graphene oxide to a silicon sludge solution composed of silicon particles and silicon carbide particles are subjected to ultrasonic treatment and separation, and at the same time, the colloidal solution is sprayed and then a silicon-carbon-graphene composite may be manufactured by a drying and heat-treatment process, and the composite may be applied to a secondary battery cathode material.

However, the silicon-carbon-graphene composite manufactured by such a single process was shown to have a capacity of 1500 mAh/g as a result of a lithium ion battery characteristic evaluation. The silicon-carbon-graphene composite manufactured by the single process was spherical, having a porous body composed of silicon and carbon particles inside, and the outside had a form of graphene surrounding the surface of the porous body. Since the silicon-carbon-graphene composite manufactured by the single process is not completely wrapped by the carbon material, if it is used for a long period of time, a problem may occur in that it is difficult to maintain a high electrostatic capacity.

As another method of manufacturing a composite, a silicon-graphene composite is produced through an aqueous phase reaction and an etching process, and thermal decomposition of acetylene gas is performed at 800° C. for 10 minutes as a CVD process and carbon is coated on the silicon-graphene, and thereby the silicon-graphene-carbon composite can be produced. At this time, the evaluation result of the characteristics of a lithium ion secondary battery applied with the manufactured composite showed that the capacity was 1000 mAh/g. However, an environmental problem is caused by the use of a harmful substance such as hydrofluoric acid during the etching process, and a problem may occur in that carbon cannot be uniformly coated on the surface of the silicon-graphene due to the thermal decomposition process of the acetylene gas.

In order to solve this problem, if the silicon particles are completely wrapped by the carbon material in double, since the silicon surface and the electrolyte do not directly contact each other, when applied to a lithium ion secondary battery, it can be used as an excellent high-capacity cathode material.

Therefore, in one aspect of the invention, unlike the above-described manufacturing of a composite by a single process, micron-sized silicon particles separated and recovered from waste silicon sludge composed of silicon and silicon carbide particles are pulverized together with a carbon precursor solution to reduce the particle size to a predetermined size while primarily producing a silicon-carbon suspension coated with a carbon precursor at the same time. A spherical silicon-carbon composite with silicon inside and coated with a carbon precursor outside is produced, and after mixing the produced silicon-carbon composite with graphene oxide, the graphene oxide is bonded surrounding the silicon-carbon composite to produce a silicon-carbon-graphene composite via an aerosol process, and an excellent electrode material for secondary battery electrode materials was developed.

There may be a multiple of silicon-carbon composites inside the silicon-carbon-graphene composite according to an aspect of the present invention, and graphene may surround the silicon-carbon composites once more to have a grape bunch-like form.

The composite produced by the manufacturing method according to an aspect of the present invention is a structure wherein silicon particles are completely covered in double with carbon material, and unlike simple silicon-carbon-graphene composites, can show high electrical conductivity in the evaluation of the lithium ion secondary battery characteristics, and large volume changes can be controlled to improve the electrochemical characteristics during charging/discharging. Further, since the manufactured silicon-carbon-graphene composite does not come into direct contact with the electrolyte during charging/discharging of the lithium secondary battery, large volume expansion is allowed, thereby preventing electrode damage thus excellent battery characteristics can be shown.

Another aspect of the present invention provides a silicon-carbon composite including, a carbon layer formed around silicon particles; and a graphene layer formed around an agglomerate comprising a plurality of the silicon-carbon composites, wherein the silicon-carbon-graphene composite has an average particle size of 0.5 μm to 20 μm, and the graphene layer is formed by agglomeration of a plurality of crumpled graphene sheets.

The silicon-carbon-graphene composite may be produced by the above-mentioned manufacturing method (step 1 to step 3).

The silicon-carbon-graphene composite may have a silicon particle size of 0.1 μm to 1 μm.

The silicon-carbon-graphene composite may have a carbon layer thickness of 1 nm to 5 nm.

The graphene layer thickness of the silicon-carbon-graphene composite may be 10 nm to 30 nm.

The silicon-carbon-graphene composite may have an average particle size of 0.5 μm to 20 μm, preferably 0.5 μm to 10 μm.

Due to the unique structure of the silicon-carbon-graphene composite including a plurality of silicon-carbon composites and a graphene layer surrounding the silicon-carbon composites, and the particle size range of the silicon-carbon-graphene composite, when applied to a lithium ion secondary battery, it can show high electrical conductivity and the charge/discharge electrochemical characteristics can be improved. That is, since the silicon surface and the electrolyte are not in direct contact with each other during charging/discharging, the generation of a solid electrolyte interface layer can be prevented and a large volume expansion can be allowed.

Yet another aspect of the present invention provides a secondary battery including, an anode; a cathode including the above-mentioned silicon-carbon-graphene composite;

a separator formed between the anode and the cathode; and an electrolyte.

The secondary battery may be a lithium secondary battery, and the composite may be utilized as a cathode active material of a lithium secondary battery.

Hereinafter, the present invention will be more specifically described by way of examples and experimental examples. However, the following examples and experimental examples are intended to illustrate the invention and are not intended to limit the scope of the invention.

EXAMPLE 1

Preparation of Si–C-Gr Composite

Step 0: First, acid leaching was performed to remove metal impurities contained in the waste silicon sludge. Acid leaching was performed using hydrochloric acid (HCl, 36%, Sigma Aldrich). 5 g of waste silicon sludge and 2 M of hydrochloric acid were mixed in a 500 ml Erlenmeyer flask and reacted sufficiently at a temperature of 100° C. for 5 hours. After the reaction, the temperature of the mixed solution was lowered to room temperature, washed twice with 5 L of distilled water using a vacuum filter, and then dried.

From the waste silicon sludge which had undergone the acid leaching process, silicon was separated and recovered by an ultrasonic treatment and centrifugation process. First, 5 g of refined waste silicon sludge was uniformly dispersed in 500 ml of distilled water to prepare a colloid. Ultrasonic treatment was performed for 5 hours to separate silicon and silicon carbide from the prepared colloidal solution. Silicon particles were recovered from the ultrasonic treated colloidal solution using a centrifugal separator (VS-5500N, Vision Science), and was rotated at a rotation speed of 500 rpm (27 g-force) for 12 minutes, to recover silicon having a particle size of 1 μm to 5 μm.

Step 1: Pulverization was performed for the silicon recovered in the above-mentioned step 1 to have a fine particle size in the. During the pulverization process, glucose was injected to prevent oxidation and to coat the carbon precursor. The equipment used for the pulverization process was a bead mill (ultra-apex mill, UAM-015, kotobukilnd. Co. Ltd.). The mill consists of cylinder and rotor and the bead used for pulverization was 0.05 mm zirconia (ZrO2). The rotational speed of the rotor was fixed at 4500 rpm and the precursor transferring flow rate was fixed at 90 ml/min during the pulverization. At this time, the silicon concentration was fixed to 5 wt % and the weight ratio of glucose/silicon was adjusted to 0.1 to obtain a silicon-glucose suspension having a particle size of 1 μm or less under all conditions. That is, an aqueous solution of glucose, which is a carbon compound, surrounds the surface of silicon in the pulverizing step and at the same time prevents the formation of silicon oxide on the silicon surface due to an oxidation process which occurs during high-speed pulverization, and produces a silicone-glucose suspension in which glucose is uniformly distributed on the surface of the silicon particles.

Step 2: The silicon-glucose suspension prepared in the above-mentioned step 1 was subjected to an ultrasonic spray-drying process to prepare a silicon-carbon composite in which the surface of the silicon particles was coated with a carbon precursor. The ultrasonic spray-drying process was performed using an ultrasonic spray nozzle, a tubular heating furnace with temperature of 400° C. and carrier gas flow rate of 1 l/minm and the concentration of the silicon-glucose suspension used in the spraying process was 0.5 wt %.

Step 3a: The silicon-carbon composite produced in step 2 was recovered and mixed with graphene oxide to prepare a silicon-carbon-graphene oxide composite by a nozzle-type spray-drying process. At this time, the concentration of the silicon-carbon composite in the mixed solution was 1 wt %, and the concentration of graphene oxide was 0.1 wt %. The nozzle type spray dryer was used to spray the colloidal solution through a two-fluid nozzle under a certain pressure, and perform a solvent evaporation process by a drying chamber preheated to a temperature of 200° C. At this time, the flow rate of the injection gas and the transfer flow rate of the precursor were set to argon gas of 10 l/min and 4.5 ml/min, respectively, and the silicon-carbon-graphene oxide composite was recovered in a cyclone.

Step 3b: The silicon-carbon-graphene oxide composite recovered in step 3a was subjected to a heat-treatment at 800° C. for 30 minutes in an Ar atmosphere and a flow rate of 1 l/min to completely reduce the graphene oxide to graphene, and glucose was carbonated to ultimately produce a silicon-carbon-graphene composite.

EXAMPLE 2

Preparation of Si—C-Gr Composite/Si: Glucose=1:0.3

A silicon-carbon-graphene composite was prepared in the same manner as in Example 1 except that the weight ratio of glucose/silicon in step 1 of Example 1 was changed to 0.3.

EXAMPLE 3

Preparation of Si—C-Gr Composite/Si:
Glucose=1:0.5

A silicon-carbon-graphene composite was prepared in the same manner as in Example 1 except that the weight ratio of glucose/silicon in step 1 of Example 1 was changed to 0.5.

EXAMPLE 4

Preparation of Si—C-Gr Composite/Si:
Glucose=1:1

A silicon-carbon-graphene composite was prepared in the same manner as in Example 1 except that the weight ratio of glucose/silicon in step 1 of Example 1 was changed to 1.

EXPERIMENTAL EXAMPLE 1

Analysis of Results Before and After Wet
Pulverization of Silicon Particles

The silicon particles prepared in step 0 of Example 1 and the silicon particles obtained by the wet pulverization process of step 1 were measured by FE-SEM, and the particle size distribution according to the number of pulverization was measured and is shown in FIGS. 4 and 5.

As shown in FIG. 4, the silicon particles before pulverization that were locally identified in the FE-SEM results showed a size of 2 μm or more, and after the pulverization, it was possible to identify silicon particles having a size of about 500 nm or less.

Referring to FIG. 5, it was found that the silicon particles before pulverization were mainly distributed within the range of 1 μm to 10 μm, and that the particle size tended to decrease as the number of pulverization cycles increased by 1, 2, and 3 times, and it showed a particle size distribution of 100 nm to 1 μm. Therefore, it was confirmed that the size of silicon particles could be effectively reduced and the particle size could be controlled through the wet pulverization process.

EXPERIMENTAL EXAMPLE 2

Shape Measurement and Thermogravimetric
Analysis of Silicon-Carbon Composite

The shape of the silicon-carbon composites produced through steps 0 to 2 of Examples 1 to 4 were photographed through FE-SEM, and thermogravimetric analysis (TGA) was performed. The results are shown in FIGS. 6 and 7.

As shown in FIG. 6, it was confirmed that the produced silicon-carbon composites were generally spherical in all conditions and had a particle size of 500 nm to 2 μm. That is, the shape difference according to the weight ratio of glucose/silicon was not so large.

Referring to FIG. 7, in the thermogravimetric analysis, the carbon content in the composite was measured at 25° C. to 800° C. in a gas atmosphere at a temperature increase rate of 5° C./min. As a result, weight changes were observed by combustion of carbon from 150° C. to 500° C., and at 600° C. and above, the weight of the sample slightly increased due to the oxidation reaction of silicon particles. When the glucose/silicon weight ratios were 0.1, 0.3, 0.5, and 1, the silicon contents in the composites were found to be about 85%, 79%, 68%, and 55%, respectively. This showed a similar value to the concentration of glucose which was added as a carbon raw material in the suspension. Therefore, it was confirmed that the ultrasonic spray-drying process is an efficient process for controlling the content of silicon wrapped in carbon when manufacturing a silicon-carbon composite.

EXPERIMENTAL EXAMPLE 3

XRD and Raman Analysis of Silicon-Carbon
Composites

X-ray diffraction analysis of the silicon-carbon composites prepared in steps 0 to 2 of Examples 1 to 4 was performed and Raman spectroscopy was performed, and the results are shown in FIGS. 8 and 9.

As shown in FIG. 8, it was possible to identify a silicon peak around 28° in all conditions. However, since the crystal phase showing the crystal phase of silicon was high and the crystal phase of carbon was relatively low, the crystal phase of carbon could not be identified. In addition, since the silicon oxide crystal phase did not appear, it was confirmed that the carbon compound, glucose, inhibited the silicon oxidation reaction occurring in the high-speed pulverization step.

Referring to FIG. 9, the existence of silicon and carbon in the silicon-carbon composite produced without graphene can be confirmed from Raman spectroscopy results. About 518 $cm^{-1}$ was representing silicon, and 1340 $cm^{-1}$ and 1600 $cm^{-1}$ was representing carbon.

EXPERIMENTAL EXAMPLE 4

Shape Measurement of Silicon-Carbon-Graphene
Composite

The respective shapes of silicon-carbon-graphene composites produced in the above Examples 1 to 4 were photographed through FE-SEM, and the results are shown in FIG. 10

As shown in FIG. 10, from the FE-SEM results, it was identified that graphene had a crumpled form with wrinkles on the surface due to capillary compression, and showed almost no silicon on the surface.

EXPERIMENTAL EXAMPLE 5

XRD and Raman Analysis of
Silicon-Carbon-Graphene Composites

X-ray diffraction analysis of the silicon-carbon-graphene composites prepared in Examples 1 to 4 was performed and Raman spectroscopy was performed, and the results are shown in FIGS. 11 and 12.

As shown in FIG. 11, it was possible to identify silicon within the silicon-carbon-graphene composites after heat-treatment around 28°, and although a graphene peak was expected to appear having a gentle slope at about 25° to 30°, it seemed difficult to distinguish the graphene peaks due to the very strong appearance of the peaks of silicon.

Referring to FIG. 12, the silicon, carbon and graphene of the silicon-carbon-graphene composite could be identified.

It could be seen that about 518 $cm^{-1}$ represents silicon, and 1340 $cm^{-1}$ and 1600 $cm^{-1}$ represents carbon and graphene.

EXPERIMENTAL EXAMPLE 6

Charge/Discharge Characteristics of Secondary Battery using Silicon-Carbon-Graphene Composite A charging/discharging experiment of a secondary battery using the silicon-carbon-graphene composite produced in the above Examples 1 to 4 and single silicon particles as a cathode material was performed to analyze the lifespan characteristics of the battery, and the results are shown in FIGS. 13(a) and 13(b).

As shown in FIG. 13(a), the results of the silicon particles showed a high initial capacity of 2800 mAh/g and showed a tendency to decrease sharply as the cycle progressed and after 15 cycles, showed 500 mAh/g. It seems that as the content of silicon in the composite increases, it exhibits a high packing density in the solid state which inhibits the movement of the electrolyte, cannot accommodate a large volume change of silicon during charging and discharging, thus resulting in a low cycle stability. On the other hand, the silicon-carbon-graphene composites showed initial capacities of 1000 mAh/g, 1900 mAh/g, 2000 mAh/g and 2300 mAh/g when the glucose/silicon weight ratio was 0.1, 0.3, 0.5, and 1, and although the initial capacity is lower than that of silicon, they all showed a capacity of 1800 mAh/g or more in 25 cycles, indicating a stable retention rate. Referring to FIGS. 13(a) and 13(b), the silicon-carbon-graphene composite exhibited the most stable cycle retention rate, showing 2200 mAh/g in 30 cycles when the glucose/silicon weight ratio was 1, and it showed that the coulombic efficiency was maintained as 99% or more. Such results seem to be shown since the composite with silicon particles additionally coated with graphene after being coated with carbon prevents the formation of an unstable solid electrolyte interfacial layer by avoiding direct contact of the electrolyte and can accommodate a large volume change of silicon during charging/discharging. When the glucose/silicon weight ratio was 0.1, 0.3, and 0.5, it was 1600 mAh/g, 1900 mAh/g and 2000 mAh/g in 30 cycles and the coulombic efficiency showed a retention rate of about 95%, 95% and 99% or more.

Although the present invention has been described with respect to specific examples of a manufacturing method of a silicon-carbon-graphene composite, a composition produced by the method, and a secondary battery using the same according to an aspect of the present invention, the composite produced thereby, and the secondary battery to which the same is applied, it is apparent that various modifications can be made without departing from the scope of the present invention.

Therefore, the scope of the present invention should not be construed as being limited to the embodiments described, but should be determined by equivalents of the appended claims, as well as the following claims.

That is, it is to be understood that the foregoing embodiments are illustrative and not restrictive in all respects and that the scope of the present invention is indicated by the appended claims rather than the foregoing description, and all changes or modifications derived from the equivalents thereof should be construed as being included within the scope of the present invention.

The invention claimed is:

1. A manufacturing method of a silicon-carbon-graphene composite, comprising,
    adding a carbon precursor solution to silicon and performing wet pulverization to prepare a suspension in step 1;
    forming a silicon-carbon composite by spray-drying the suspension in step 2; and
    spray-drying and heat-treating a mixed solution of the silicon-carbon composite and a graphene oxide in step 3.

2. The method of claim 1, wherein the silicon of said step 1 is obtained by, acid-leaching a waste silicon sludge and selectively separating and recovering silicon in step 0.

3. The method of claim 2, wherein said step 0 further comprises, drying after the acid-leaching, and after preforming ultrasonic treatment on a solution comprising the waste silicon sludge that was subject to drying, the silicon is selectively separated and recovered by centrifugal separation.

4. The method of claim 3, wherein the ultrasonic treatment of said step 0 is performed for 1 hour to 10 hours,
    and the centrifugal separation of said step 0 is performed at a rotation speed of 100 rpm to 1000 rpm for 1 minute to 60 minutes.

5. The method of claim 1, wherein the carbon precursor of said step 1 comprises one or more selected from the group consisting of monosaccharides, disaccharides, polysaccharides, polyvinylpyrrolidone (PVP), polyethylene glycol (PEG), and polyvinyl alcohol (PVA).

6. The method of claim 1, wherein a mixing ratio of the silicon and the carbon precursor is 1:0.1 to 1:2.

7. The method of claim 1 wherein, the wet pulverization of said step 1 is performed such that an average particle size of the silicon is 0.1 μm to 1 μm.

8. The method of claim 1 wherein, the wet pulverization of said step 1 is performed by one or more methods selected from the group consisting of a bead mill, a basket mill, an attrition mill, and a ball mill.

9. The method of claim 1 wherein, the spraying of said step 2 is performed by ultrasonic spraying at an ultrasonic frequency of from 1.0 Mhz to 2.5 Mhz.

10. The method of claim 1 wherein, the drying described in step 2 is performed by passing a sprayed material through a tubular heating furnace via a carrier gas.

11. The method of claim 1 wherein, the solution of said step 3 has a graphene oxide concentration of 0.05 wt % to 0.2 wt %,
    and the solution of said step 3 has a silicon-carbon composite concentration of 0.1 wt % to 3 wt %.

12. The method of claim 1 wherein, the spray-drying of said step 3 is performed by,
    spraying a mixed solution of the silicon-carbon composite and graphene oxide in a form of aerosol droplets through a two-fluid nozzle in step 3a;
    drying and heat-treating the sprayed droplets by passing the sprayed droplets through a tubular heating furnace via a carrier gas in step 3b.

13. The method according to claim 1, wherein the heat-treatment temperature described in said step 3 is 500° C. to 1000° C.

14. A manufacturing method of a silicon-carbon-graphene composite, comprising,
    acid-leaching a waste silicon sludge, and selectively separating and recovering silicon by ultrasonic treatment and centrifugal separation in step 0;
    adding a carbon precursor solution to the recovered silicon and performing wet pulverization to prepare a suspension in step 1;
    forming a silicon-carbon composite by ultrasonically spray-drying the suspension in step 2;

spraying a mixed solution of the silicon-carbon composite and graphene oxide in a form of aerosol droplets through a two-fluid nozzle in step 3a; and drying and heat-treating the sprayed droplets by passing the sprayed droplets through a tubular heating furnace via a carrier gas in step 3b.

15. A silicon-carbon-graphene composite comprising, a silicon-carbon composite comprising a carbon layer formed around silicon particles; and a graphene layer formed around an agglomerate comprising a plurality of the silicon-carbon composites, wherein the silicon-carbon-graphene composite has an average particle size of 0.5 µm to 20 µm, and the graphene layer is formed by agglomeration of a plurality of crumpled graphene sheets.

16. A secondary battery comprising, an anode; a cathode comprising the silicon-carbon-graphene composite of claim 15;

a separator formed between the anode and the cathode; and an electrolyte.

* * * * *